US011853922B2

(12) United States Patent
Kochura et al.

(10) Patent No.: US 11,853,922 B2
(45) Date of Patent: Dec. 26, 2023

(54) USAGE METRIC-BASED WARRANTY FOR INTERNET-OF-THINGS DEVICES

(71) Applicant: INTERNATIONAL BUSINESS MACHINES CORPORATION, Armonk, NY (US)

(72) Inventors: Nadiya Kochura, Bolton, MA (US); Shikhar Kwatra, Durham, NC (US); Tiberiu Suto, Franklin, NY (US); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 16/865,232

(22) Filed: May 1, 2020

(65) Prior Publication Data

US 2021/0342855 A1 Nov. 4, 2021

(51) Int. Cl.
*G06Q 30/012* (2023.01)
*G06Q 10/10* (2023.01)
*G06F 16/23* (2019.01)
*G16Y 40/10* (2020.01)

(52) U.S. Cl.
CPC ....... *G06Q 30/012* (2013.01); *G06F 16/2379* (2019.01); *G06Q 10/10* (2013.01); *G16Y 40/10* (2020.01)

(58) Field of Classification Search
USPC ....................................................... 705/302
See application file for complete search history.

(56) References Cited

U.S. PATENT DOCUMENTS

| | | | |
|---|---|---|---|
| 2010/0293020 A1 | 11/2010 | Tan et al. | |
| 2017/0215261 A1* | 7/2017 | Potucek | H04L 67/53 |
| 2018/0137457 A1 | 5/2018 | Sachs et al. | |
| 2018/0240124 A1 | 8/2018 | Natarajan et al. | |
| 2020/0134139 A1* | 4/2020 | Vaish | G06F 21/64 |
| 2021/0248616 A1* | 8/2021 | Foster | H04L 9/3236 |

FOREIGN PATENT DOCUMENTS

JP 5895174 B2 * 3/2016 ............. G06Q 30/00

OTHER PUBLICATIONS

B. Yu, J. Wright, S. Nepal, L. Zhu, J. Liu and R. Ranjan, "IoTChain: Establishing Trust in the Internet of Things Ecosystem Using Blockchain," in IEEE Cloud Computing, vol. 5, No. 4, pp. 12-23, Jul./Aug. 2018, doi: 10.1109/MCC.2018.043221010. (Year: 2018).*

(Continued)

*Primary Examiner* — Michael Young
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented for warranty tracking and transactions based on usage metrics by use of blockchain. The methods include, for instance: obtaining a usage report of an IoT device in a predefined format. The usage report is recorded in a blockchain network, and a warranty balance, also recorded in the blockchain network, is updated in the amount corresponding to the usage report on the IoT device. A warranty claim is resolved based on records of the usage report and the warranty balance for the IoT device as recorded in the blockchain network.

19 Claims, 7 Drawing Sheets

(56) References Cited

OTHER PUBLICATIONS

Anonymous, "Cognitive Sales & Warranty Customization," IP.com No. IPCOM000255964D, Oct. 26, 2018, 4 pgs.

"Usage-Based Warranty Analysis", Reliability HotWire, Issue 73, Mar. 2007, 9 pgs. Retrieved on Apr. 1, 2021 from the Internet URL: <https://www.weibull.com/hotwire/issue73/hottopics73.htm>.

"Blockchain-based warranty solution promises to prevent fraudulent product returns", blockchain technews, 2 pgs. Retrieved on Feb. 13, 2020 from the Internet URL: <https://www.blockchaintechnews.com/news/blockchain-based-warranty-solution-promises-to-prevent-fraudulent-product-returns/>.

"Verso, Factom integration enables blockchain-based warranty claims management", blockchain technews, 1 pg. Retrieved on Feb. 13, 2020 from the Internet URL: <https://www.blockchaintechnews.com/news/verso-factom-integration-enables-blockchain-based-warranty-claims-management/>.

Jones, M., "Blockchain for Automotive: spare parts and warranty", Jun. 21, 2017, 8 pgs. Retrieved on Feb. 13, 2020 from the Internet URL: <https://www.ibm.com/blogs/internet-of-things/iot-blockchain-automotive-industry/>.

Mell, Peter, et al., "The NIST Definition of Cloud Computing", NIST Special Publication 800-145, Sep. 2011, Gaithersburg, MD, 7 pgs.

"Internet of Things Market Size, Growth | IoT Industry Report [2020-2027]", Jul. 2020, 9 pgs. Retrieved on Apr. 1, 2021 from the Internet URL: <https://www.fortunebusinessinsights.com/industry-reports/internet-of-things-iot-market-100307>.

"Blockchain Explorer—Search the Blockchain", 7 pgs. Retrieved on Apr. 1, 2021 from the Internet URL: <https://www.blockchain.com/explorer?currency=BTC&stat=transactions>.

\* cited by examiner

US 11,853,922 B2

USAGE METRIC-BASED WARRANTY FOR INTERNET-OF-THINGS DEVICES

TECHNICAL FIELD

The present disclosure relates to warranty for Internet of Things (IoT) devices, and more particularly to methods, computer program products, and systems for warranty tracking and transactions based on usage metrics by use of blockchain.

BACKGROUND

Conventionally, manufacturer's warranty on most products for refund, exchange, or repairs are period-based from a certain date. For example, it is common that the manufacturer's warranty covers an electrical/electronic device for a year from the date of purchase based on a registration within the first 90 days, or if the customer requests a repair with the purchase receipt and/or any other proof of purchase. Most manufacturers often inform customers on any conditions and/or events that might void the warranty on the products even within the warranty period, if such conditions and/or events during the use by the customer would cause the products to function not as originally described or intended without any defect on the product. Conventional warranty claims are often subject to dispute on what happened to the product in determining whether or not the product should be covered under the warranty.

SUMMARY

The shortcomings of the prior art are overcome, and additional advantages are provided, through the provision, in one aspect, of a method. The method includes, for instance, obtaining, by one or more processors, a usage report of an Internet of Things (IoT) device in a predefined format; recording, by the one or more processors, the usage report of the IoT device in a blockchain network; updating, by the one or more processors, a warranty balance for the IoT device by reducing an amount of the warranty balance corresponding to the usage report of the IoT device from a current value of the warranty balance, wherein the warranty balance for the IoT device is stored in the blockchain network; and resolving, by the one or more processors, a warranty claim on the IoT device based on respective blockchain records of the usage report and the warranty balance regarding the IoT device.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

As noted, conventional manufacturer's warranty on products are period-based from a certain date. However, certain working conditions and manners of use, even for a product with no defect within specified working conditions, can also affect how long the product would last and function well. Also, users may have vast differences in mannerism, use habits, and the level of care, so time-based manufacturer's warranty may not be fair for all users.

For certain warranty claims in conventional warranty systems, because there is no agreed account on how the product is in a certain state and the warranty claim came to be, manufacturers are often required to investigate such warranty claims, which drives up the cost of the product for all users.

The users often are asked to buy an extended warranty on products at the time of purchase, but users often do not feel the need for such extended warranty until they start using the product. Also, with the conventional warranty systems, users often forget to register the product and/or to keep the receipts or other proof of purchase, so when the users need the coverage under the warranty, it might not be successfully claimed even if the product should be covered by all means.

Embodiments of the present invention will now be described in detail with reference to the Figures.

Figure 1:
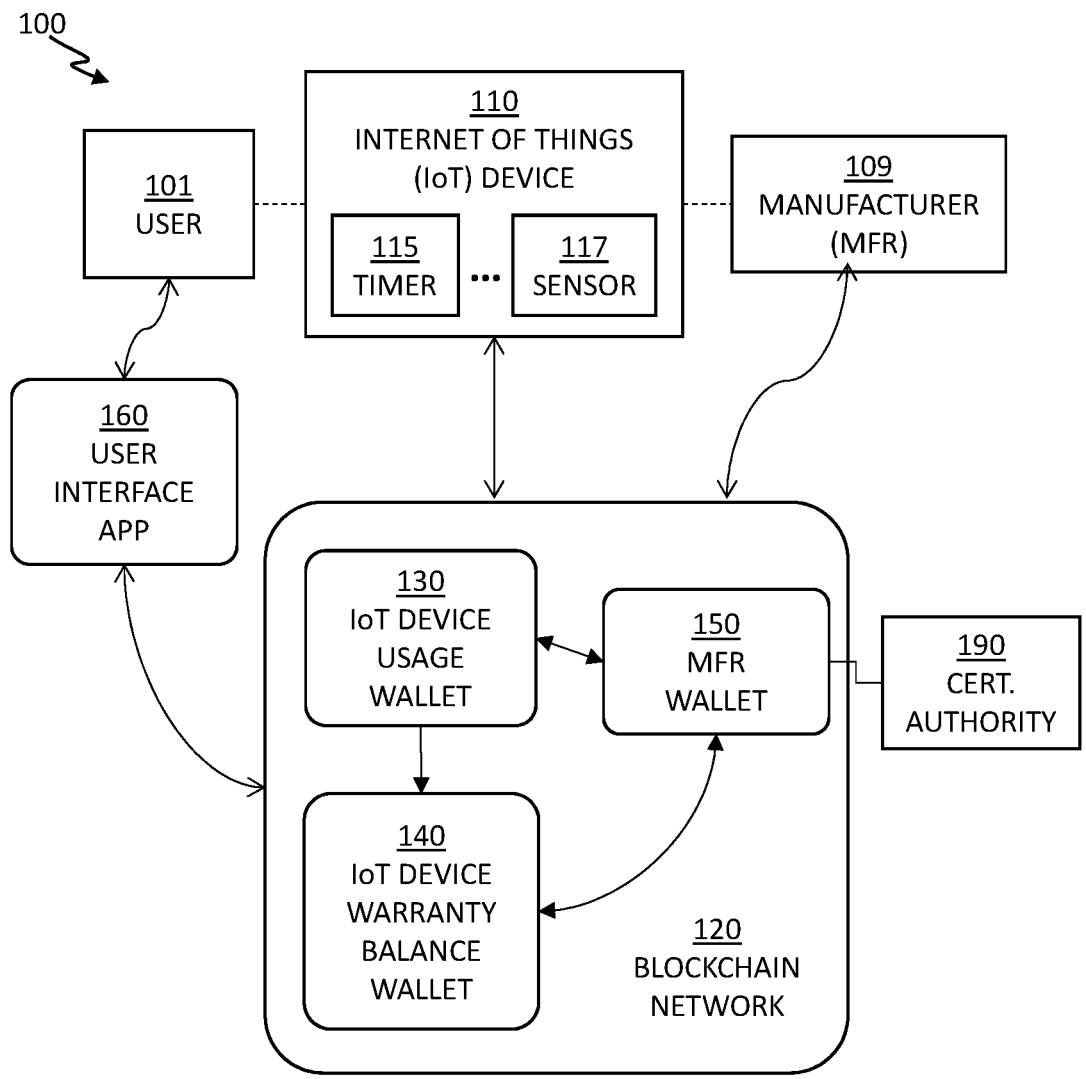
FIG. 1 depicts an enhanced warranty system for Internet of Things (IoT) devices based on usage metrics, in accordance with one or more embodiments set forth herein.

FIG. 1 depicts an enhanced warranty system 100 for Internet of Things (IoT) devices based on usage metrics, in accordance with one or more embodiments set forth herein.

The enhanced warranty system 100 provides transparently and unalterably shared record of usage of products based on communication networks and blockchain in offering a customized warranty system for respective products that can benefit both users and manufacturers. For example, if a laptop computer conventionally covered by a one-year manufacturer's warranty is actually based on an average eight (8) hours of daily use and the one-year warranty is supposed to cover a total of three thousand (3,000) hours of use for the first year from the date of purchase, a user who uses the laptop computer for two to three hours a day can have three or more years of manufacturer's warranty if the warranty is based on the usage rather than the simple one-year term, which can be beneficial to the user with less daily use and fair to all users.

The enhanced warranty system 100 includes one or more IoT devices subject to respective warranties and a blockchain network 120 that is a platform of the enhanced warranty system 100. A manufacturer 109 is an entity that produces an IoT device 110 of the one or more IoT devices, and a user 101 purchases and/or uses the IoT device 110 for the purpose of a warranty corresponding to the IoT device 110. The manufacturer 109 provides manufacturer's warranty on the IoT device 110 to the user 101 by use of the enhanced warranty system 100. The blockchain network 120 can be established by the manufacturer 109.

The user 101 accesses the blockchain network 120 by use of a user interface application (UIA) 160 for the enhanced warranty system 100. The UIA 160 can be a mobile app running on a smartphone to view current usage data for the IoT device 110 and a current warranty balance on the IoT device 110 corresponding to the current usage data. The UIA 160 is also used to communicate and to further interact with the manufacturer 109 regarding the warranty of the IoT device 110. For example, the UIA 160 can alert the user 101 on expiring warranty based on that the IoT device warranty balance value became less than a warranty balance threshold to alert the user 101 and recommend any extended warranty available to the user 101.

The IoT device 110 includes a timer 115, a sensor 117, and any other mechanism embedded into the IoT device to detect conditions that affect the manufacturer's warranty on the IoT device 110, as well as a process for communicating with the blockchain network 120. The manufacturer 109 devised a set of working conditions that affect the manufacturer's warranty of the IoT device 110, and configured the IoT device 110 to report by use of such detection mechanism including the timer 115 and the sensor 117 for the purpose of collecting data for the enhanced warranty system 100. For example, the timer 115 can be conveniently implemented as a 555 timer Integrated Circuit (IC) on a printed circuit board (PCB) of the IoT device 110 along with other parts. A few examples of working conditions that affect the manufacturer's warranty of the IoT device 110 include, but not limited to, how often the IoT device 110 runs and intervals between run cycles, a length of each run cycle, a power level or other level of intensity of each run cycle, any environmental condition of the IoT device 110 including temperature and humidity, and any event that can void the manufacturer's warranty on the IoT device 110 such as submersion or a drop from a certain height, depending on a type and functionality of the IoT device 110.

The IoT device 110 reports usage data to the blockchain network 120, by use of a blockchain interface process as noted above. The IoT device 110 is uniquely identified with a certain identifier such as manufacturer's serial number, and the identifier is reported along with the usage data of the IoT device 110. All blockchain nodes of the blockchain network 120 including the IoT device usage blockchain, the IoT device warranty balance blockchain, and the manufacturer blockchain would identify the IoT device 110 and associate respective usage data and warranty balances with the uniquely identified IoT device 110. The blockchain nodes can further include other device metadata such as a model number, the date of manufacture, a material parts list, blockchain wallet addresses associated with the IoT device 110, and any other information that can affect the warranty balance of the IoT device 110 at the moment or an availability of warranty extension in cases the user 101 wishes to have.

In the blockchain network 120, the IoT device 110 is represented by an IoT device usage wallet 130 and an IoT device warranty balance wallet 140. The IoT device usage wallet 130 and the IoT device warranty balance wallet 140 are identified by respective wallet addresses to be publicly shared amongst participants of the blockchain network 120 for access in viewing and verification. The IoT device usage wallet 130 and the IoT device warranty balance wallet 140 are loaded with respective credits that would be exhausted over time proportional to the usage of the IoT device 110, and that would be replenished if the user 101 extends the warranty on the IoT device 110.

The manufacturer 109 is represented by a manufacturer wallet 150 in the blockchain network 120. Warranty data of the IoT device 110 subject to transactions by the manufacturer wallet 150, which can be referred to as a manufacturer blockchain, can be optionally and/or occasionally replicated by a certification authority 190. The certification authority 190 is a trusted third party outside of the blockchain network 120 for additional assurance on transparency and accuracy of the transactions as performed by the manufacturer wallet 150 on the warranty data of the IoT device 110, for audit or for any warranty claims.

For the enhanced warranty system 100, the user 101, the manufacturer 109, and the IoT device 110 can request transactions in the blockchain network 120. The blockchain network 120 is a Peer to Peer (P2P) network in which participants of the blockchain network 120 that process requested transactions and store records of the requested transactions are referred to as respective blockchain nodes. The records of transactions requested by the user 101, the manufacturer 109, and/or the IoT device 110 can be stored in many blockchain nodes in the blockchain network 120, such that the records of transactions as performed by the request from the user 101, the manufacturer 109, or the IoT device 110 can be transparently shared in a tamperproof manner. The blockchain network 120 for the enhanced warranty system 100 records respective blockchains for the IoT device usage data and the IoT device warranty balance. Each transaction on either the IoT device usage data or the IoT device warranty balance is added to the respective blockchain once verified amongst parties to each transaction as a new block to the corresponding blockchain, which will not be altered and can be shared transparently, as the record is distributed amongst the blockchain nodes.

In this specification, the term "wallet" indicates a software client having a private key to access, to view, and to create transactions on a particular blockchain for which the wallet is designed. Accordingly, the blockchain network 120 includes an IoT device usage blockchain that corresponds to the IoT device usage wallet 130, an IoT device usage warranty balance blockchain that corresponds to the IoT device warranty balance wallet 140, and a manufacturer blockchain that corresponds to the manufacturer wallet 150.

The IoT device 110 accesses and creates a record of IoT device usage on the IoT device usage blockchain via the IoT device usage wallet 130. The IoT device warranty balance wallet 140 accesses the IoT device usage blockchain as updated by the IoT device usage wallet 130 and creates a record of IoT device warranty balance onto the IoT device usage warranty balance blockchain. Similarly, the manufacturer wallet 150 accesses the IoT device usage blockchain as updated by the IoT device usage wallet 130 and creates a record of IoT device warranty balance onto the manufacturer blockchain. Accordingly, the IoT device warranty balance values accessed by the IoT device warranty balance wallet 140 and the manufacturer wallet 150 would be synchronized. Each blockchain can be copied to a plurality of participants, which is referred to as a blockchain node, of the blockchain network 120. The manufacturer 109 and the user 101 can access blockchain nodes storing the IoT device usage data and/or the IoT device warranty balance in the blockchain network 120, such that the IoT device usage data and/or the IoT device warranty balance would be shared in a manner transparent and unalterable for the purpose of the enhanced warranty system 100.

In this specification, functionalities of the blockchain network 120 are described in terms of wallet transactions, which are recorded in respectively corresponding blockchains to be shared amongst certain blockchain nodes of the blockchain network 120, in order to achieve a transparent, verifiable, and unalterable record of the wallet transactions. Further details on the blockchain nodes and blockchain wallets are not within the scope of the present specification.

By use of the IoT device usage wallet 130, the IoT device warranty balance wallet 140, and the manufacturer wallet 150 in the blockchain network 120, the user 101 and the vendor 109 can transparently share a record of usage on the IoT device 110.

As noted, the IoT device warranty balance wallet 140 corresponds to the IoT device usage wallet 130 and the IoT device warranty balance is adjusted according to the IoT device usage as reported by the IoT device 110. The manufacturer 109 can quantify an effect of a certain usage on the IoT device 110 in terms of a certain depreciation on the lifespan of the IoT device and reduce the warranty hours accordingly.

In certain embodiments of the present invention, the IoT device usage wallet 130 and the IoT device warranty balance wallet 140 can be integrated in the IoT device 110, and/or the IoT device 110 can also be one of a blockchain node that holds copies of the IoT device usage data and the IoT device warranty balance data represented in respective blockchains. Similarly, in certain embodiments of the present invention, the manufacturer 109, or a blockchain node representing the manufacturer 109 in the blockchain network 120, which is a combination of a process to perform transactions and a record of the transactions referred to as a blockchain, can include the manufacturer wallet 150.

Figure 2:
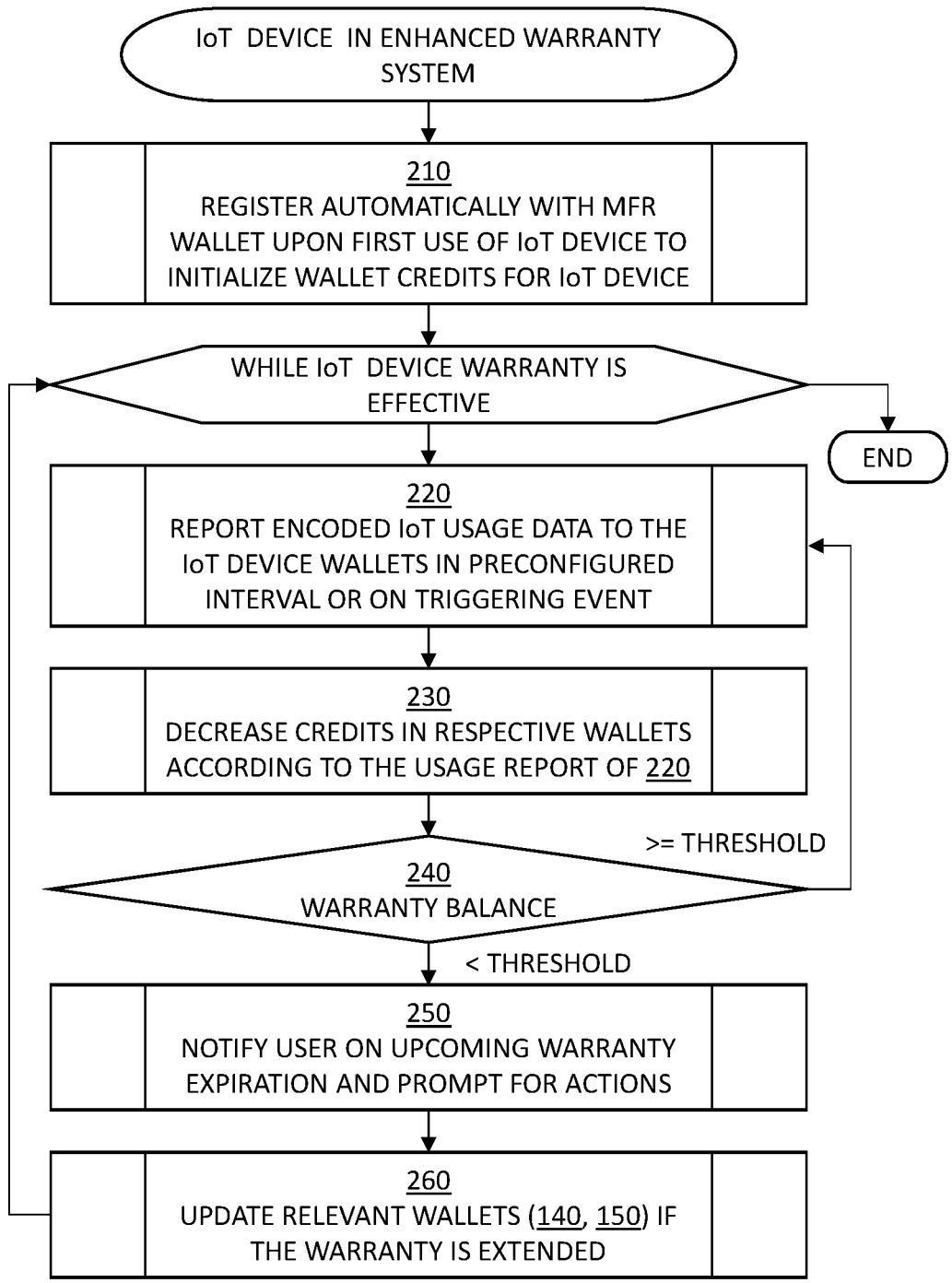
FIG. 2 depicts a flowchart of operations performed by an IoT device in the enhanced warranty system of FIG. 1, in accordance with one or more embodiments set forth herein.

Detailed operations of the IoT device 110, along with the IoT device usage wallet 130 and the IoT device warranty balance wallet 140, are described in FIG. 2 and corresponding description.

Figure 3:
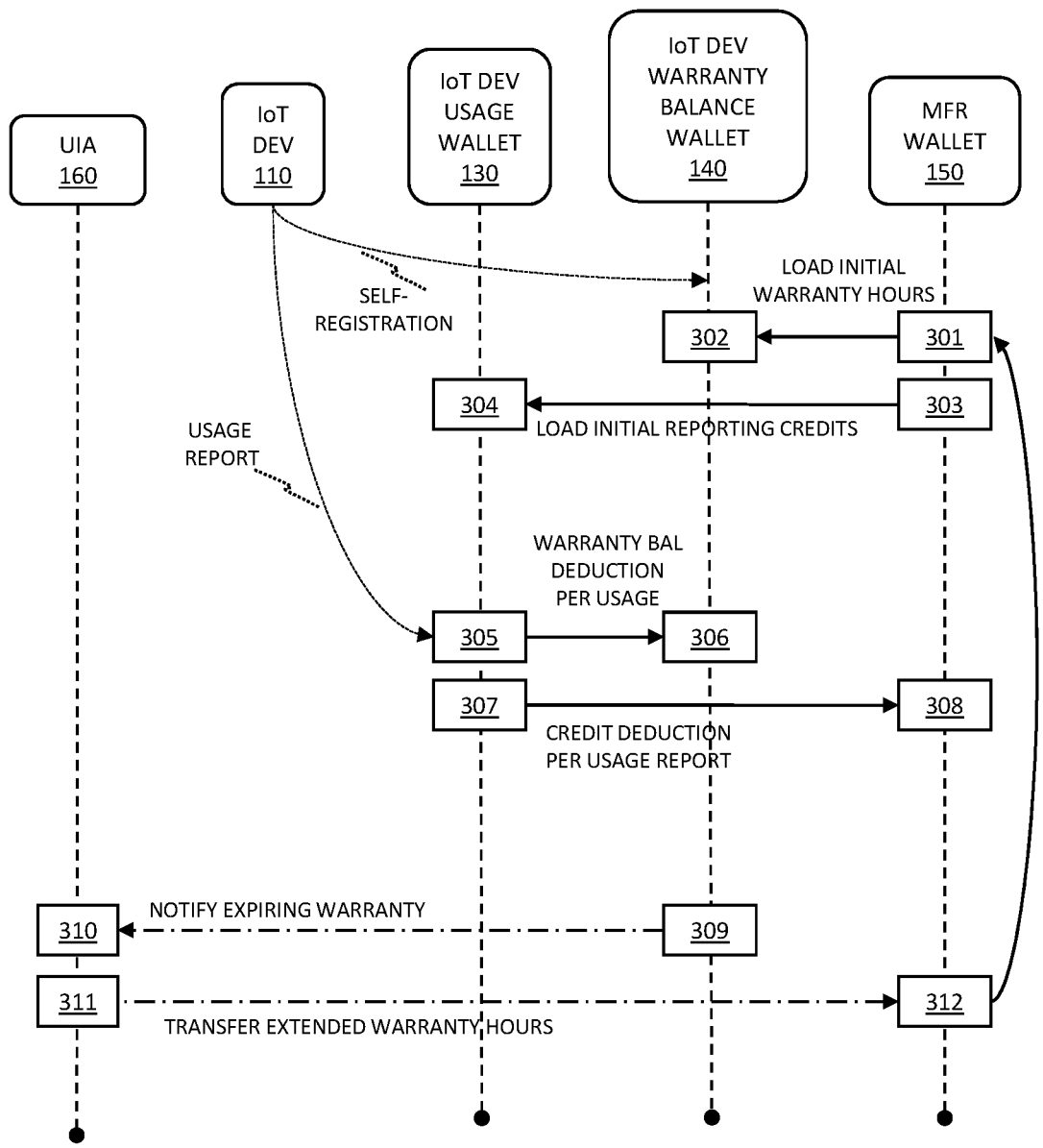
FIG. 3 depicts transactions performed amongst blockchain wallets comprising the entities of the enhanced warranty system of FIG. 1, in accordance with one or more embodiments set forth herein.

Detailed interactions amongst the IoT device 110, the IoT device usage wallet 130, the IoT device warranty balance wallet 140, the manufacturer wallet 150, and the UIA 160 are described in FIG. 3 and corresponding description.

FIG. 2 depicts a flowchart of operations performed by the IoT device 110 in the enhanced warranty system 100 of FIG. 1, in accordance with one or more embodiments set forth herein.

In FIG. 2, the operations of the IoT device 110 for the purpose of the enhanced warranty system 100 throughout its lifetime are described. The operations of the IoT device 110 include the operations by the IoT device 110 itself communicating with the blockchain network 120, as well as transactions on corresponding blockchain nodes that are performed by the IoT device usage wallet 130 and the IoT device warranty balance wallet 140.

In block 210, the IoT device 110 automatically registers the IoT device 110 with the manufacturer wallet 150 in the blockchain network 120, upon being used for the first time. When the user 101 first starts using the IoT device 110 in an environment where access to Internet is available for the IoT device 110, the IoT device 110 automatically reports, via the Internet, all device metadata of the IoT device 110 that can identify the IoT device 110 within the blockchain network 120 such that the manufacturer 109 would initiate and/or activate the IoT device usage wallet 130 and the IoT device warranty balance wallet 140 by transferring respective credits from the manufacturer wallet 150 to the IoT device usage wallet 130 and the IoT device warranty balance wallet 140. Then, in an embodiment, the IoT device 110 proceeds with block 220.

In certain embodiments of the present invention, the IoT device usage wallet 130 and the IoT device warranty balance wallet 140 are initialized with a certain value of usage reporting credits and an instance of initial warranty hours, respectively, as the manufacturer wallet 150 transfers the initial values of the usage reporting credits and warranty hours to the respective wallets 130, 140, once the IoT device 110 registers itself upon the first use. In other embodiments of the present invention, the IoT device usage wallet 130 and the IoT device warranty balance wallet 140 are previously initialized with a certain value of usage reporting credits and an instance of initial warranty hours, respectively, and when the IoT device 110 registers itself upon the first use, the manufacturer wallet 150 can activate the respective wallets 130, 140 to keep track of the usage and warranty balance from then on.

Blocks 220 through 260 describes operations of the IoT device 110 that are relevant to the enhanced warranty system 100 while the warranty on the IoT device 110 is effective. When the warranty on the IoT device 110 expires, the IoT device 110 operations regarding the enhanced warranty system 100 terminates.

In block 220, the IoT device 110 reports, in real time, instances of encoded IoT device usage data to the IoT device usage wallet 130 in the blockchain network 120 when the IoT device 110 runs. The IoT device 110 uploads the encoded IoT device usage data to the blockchain network 120 as the IoT device 110 runs. Accordingly, the user 101 can also view the usage data of the IoT device 110 in real time on the UIA 160, or in certain frequencies configured for synchronization with the UIA 160 viewing. The IoT device usage wallet 130 records the IoT device usage data to the IoT device usage blockchain in the blockchain network 120. If the IoT device 110 is kept running for a certain period of time, the IoT device 110 can report at an interval even within a same run. The IoT device 110 can report a certain triggering event configured for reporting such as a certain high temperature, a certain extended run cycle, a submersion under water, a drop from a certain height, etc. The IoT device 110 reports in an encoded data format specific for the IoT device 110. Then, in an embodiment, the IoT device 110 proceeds with block 230.

In block 230, the IoT device 110 decreases credits in the respective IoT device wallets 130, 140, according to the IoT usage data report from block 220. As noted in block 220, the IoT device usage wallet 130 recorded the IoT device usage data to the IoT device usage blockchain in the blockchain network 120. The IoT device usage wallet 130 translates the intensity and the amount of time corresponding to the IoT device usage data from block 220 to an instance of warranty hours, and requests the IoT device warranty balance wallet 140 for a transaction to decrease the instance of warranty hours from a current value stored in the IoT device warranty balance blockchain for the IoT device 110. The IoT device warranty balance wallet 140 can also request the manufacturer wallet 150 for the same transaction to decrease the instance of warranty hours from a current value stored in the manufacturer blockchain as a warranty balance for the IoT device 110. Then, in an embodiment, the IoT device 110 proceeds with block 240.

In block 240, the IoT device determines whether or not the warranty balance for the IoT device 110 resulting from block 230 is large enough not to alert the user 101 on the expiring warranty. If the IoT device determines that the warranty balance for the IoT device 110 resulting from block 230 is greater than or equal to the warranty balance threshold to alert the user 101, then the IoT device 110 loops back to block 220 for a next report of the IoT usage data. If the IoT device determines that the warranty balance for the IoT device 110 resulting from block 230 is less than the warranty balance threshold to alert the user 101, then, in an embodiment, the IoT device 110 proceeds with block 250.

In block 250, the IoT device notifies the user 101 that the warranty balance for the IoT device 110 is expiring and recommends the user 101 to extend the warranty for the IoT device 110. In certain embodiments of the present invention, the IoT device warranty balance wallet 140 can send a push notification of the expiring warranty to the UIA 160 running on the mobile phone of the user 101. The UIA 160 facilitates blockchain transactions for the user 101 to transfer a certain number of additional warranty hours from the manufacturer wallet 150 to the IoT device warranty balance wallet 140 and to transfer a certain amount of additional reporting credits from the manufacturer wallet 150 to the IoT device usage wallet 130, by use of various conventional payment methods available on-line. Then, in an embodiment, the IoT device 110 proceeds with block 260.

In block 260, the IoT device 110 updates the IoT device usage reporting credits and the IoT device warranty balance from respective blockchains by use of the IoT device usage wallet 130 and the IoT device warranty balance wallet 140, respectively, if the user 101 had extended the warranty with the manufacturer 109 via the UIA 160. If the user 101 had not taken any action but the IoT device warranty balance had not expired yet, then, the IoT device 110 loops back to block 220 for a next report on the IoT device usage. If the user 101 had not taken any action and the IoT device warranty balance had expired, then, the IoT device 110 terminates processing for the purpose of the enhanced warranty system 100.

In certain embodiments of the present invention, the user 101 can renew the warranty on the IoT device 110 by selecting an option from a certain group of warranties offered by the manufacturer 109 from the UIA 160, within a certain time period as set by the manufacturer 109 after the expiration. In the same embodiment of the present invention, the manufacturer wallet 150 can facilitate to perform a transfer of certain number of reporting credits and a specified amount of the warranty balance for the IoT device 110 to the IoT device usage wallet 130 and the IoT device warranty balance wallet 140, respectively. Further in the same embodiment of the present invention, for the warranty gap between the period of the date of the expiration and the date of the renewal, a certain amount of warranty balance can be deducted, proportional to the number of days corresponding to the warranty gap. In the same embodiment of the present invention, the amount of deduction for the warranty gap can be estimated based on maximum intensity of usage, average usage by the user 101 during the period while the warranty was effective, or any other method specified by the manufacturer 109, depending on the value and type of usage relevant to the IoT device 110. Also, any damages or operating conditions of the IoT device 110 should be inspected and reported for a renewal.

In certain embodiments of the present invention, the user 101 can report a warranty claim on malfunctions of the IoT device 110 via the UIA 160 for a repair or an exchange. Upon receiving the warranty claim, the manufacturer 109 reviews the IoT device usage data and the IoT device warranty balance and processes the warrant claim accordingly. As the blockchain records of IoT device usage and the IoT device warranty balance are transparent, verifiable, and unalterable as shared via the blockchain network 120, both the user 101 and the manufacturer 109 can trust the records and accordingly the warranty claim could be processed based on the blockchain records of IoT device usage and the IoT device warranty balance. The outcome of the warranty claim can be more satisfactory than in conventional warranty systems where there is no record on how the IoT device 110 has been used up to the time of warranty claim as each use on the IoT device 110 has been recorded, the IoT device 110 had been automatically registered, and the question on whether or not the IoT device 110 is covered by a warranty is clearly answered by the value of the warranty balance on the IoT device 110.

FIG. 3 depicts exemplary transactions performed amongst blockchain wallets in the components of the enhanced warranty system 100 of FIG. 1, in accordance with one or more embodiments set forth herein.

The components of the enhanced warranty system 100 from FIG. 1 are shown in FIG. 3, including the IoT device 110, the IoT device usage wallet 130, the IoT device warranty balance wallet 140, the manufacturer wallet 150, and the user interface app 160.

In FIG. 2 above, the IoT device 110, the IoT device usage wallet 130, and the IoT device warranty balance wallet 140 had been collectively referred to as the IoT device 110. In FIG. 3, the operations of the IoT device 110 described in FIG. 2 are further detailed as distinguished between the blockchain transactions and other types of operations. In FIG. 3, blockchain transactions are marked as solid arrows from a wallet which initiates a transaction to change a credit to another wallet which reflects the requested transaction in credits.

When the IoT device 110 registers itself by sending device metadata that identifies the IoT device 110 upon being turned on for the first time, the manufacturer wallet 150 performs transaction 301-302 to transfer an initial warranty hours corresponding to the IoT device 110 from the manufacturer wallet 150 to the IoT device warranty balance wallet 140. The manufacturer wallet 150 also performs transaction 303-304 to transfer an initial usage reporting credits for the IoT device 110 from the manufacturer wallet 150 to the IoT device usage wallet 130.

For example, if the IoT device 110 is a blender coded "1blender395" as identified by the manufacturer 109 named A which made the blender, when the IoT device 110 "1blender395" is turned on for the first time in Internet-accessible environment, the IoT device 110 "1blender395" sends in a time-attribute stamp that is preconfigured for reporting usage on the IoT device 110 "1blender395". For example, the time-attribute stamp for the IoT device 110 "1blender395" and for the same models can be "DEVSN_YYMMDDMMSSAABBCCDDEEFF", in which DEVSN is a device serial number to identify each blender made by the manufacturer 109 A, YYMMDD indicates the date by year in two digits (YY), month in two digits (MM), and day in two digits (DD), MMSS indicates the duration of a run cycle that is being reported by minutes in two digits (MM) and seconds in two digits (SS), AABBCCCDDEEFF indicates specifics of the run cycle and working environment, as in AA for a two-digit power level in percentage, BB is for a two-digit humidity, CCC is for a three-digit temperature representing degrees in Fahrenheit (° F.), and so on. Respective parameters in the time-attribute stamp can be instantiated by the readings from respective detectors embedded in the IoT device 110 "1blender395" or parts of the IoT device 110 "1blender395" that generate data such as power level adjustment units.

In the same example, the manufacture wallet 150 can activate the IoT device usage data wallet 130 "1blender395a" by the transaction 303-304, and can activate the IoT device warranty balance wallet 140 "1blender395b" by the transaction 301-302.

When the user 101 runs the IoT device 110, the IoT device 110 reports the usage data to the blockchain network 120. The IoT device usage data wallet 130 receives the usage data and calculates certain warranty hours corresponding to the usage data, then performs transaction 305-306 to reduce the certain warranty hours corresponding to the usage data from the IoT device warranty balance wallet 140. The IoT device usage data wallet 130 performs transaction 307-308 to transfer the reporting credit corresponding to the usage report from the IoT device usage data wallet 130 to the manufacturer wallet 150. The manufacturer wallet 308 can trace the usage data upon which the reporting credit has been used in the blockchain network 120 when the usage data is needed for verification. As the reporting of the IoT device usage can be periodical or upon being triggered by a certain working conditions that affect the warranty on the IoT device 110, the manufacturer 109 can set the reporting credits to a certain number such that exhausting the reporting credit can be translated as the IoT device 110 had been over with an expected life span or an expected number of run cycles with no defect.

Transaction 309-310 indicates that the UIA 160 receives a notification by the IoT device warranty balance wallet 140 as the warranty balance for the IoT device 110 is less than a threshold set to alert the user 101. Alternatively, the IoT device usage wallet 130 can also send a notification to the UIA 160 based on that a value of the reporting credits is less than another threshold set to alert the user 101. In certain embodiments of the present invention, because the UIA 160 can access and view respective data in the IoT device usage wallet 130 and the IoT device warranty balance wallet 140, the UIA 160 can generate an alert such as a push notification on the mobile phone for the user 101 upon checking the values of respective data in the IoT device usage wallet 130 and the IoT device warranty balance wallet 140.

Transaction 311-312 indicates that the user 101 extended the warranty hours for the IoT device 110 via the UIA 160 or any other online transaction method to have the amount of extended warranty hours from the manufacturer wallet 150. Transaction 312-301 indicates that the manufacturer wallet 150 loads the amount of extended warranty hours as extended by the user to the IoT device warranty balance wallet 140. Another transaction 303-304 would follow the re-load of the IoT device warranty balance wallet 140 with the extended warranty hours.

Figure 4:
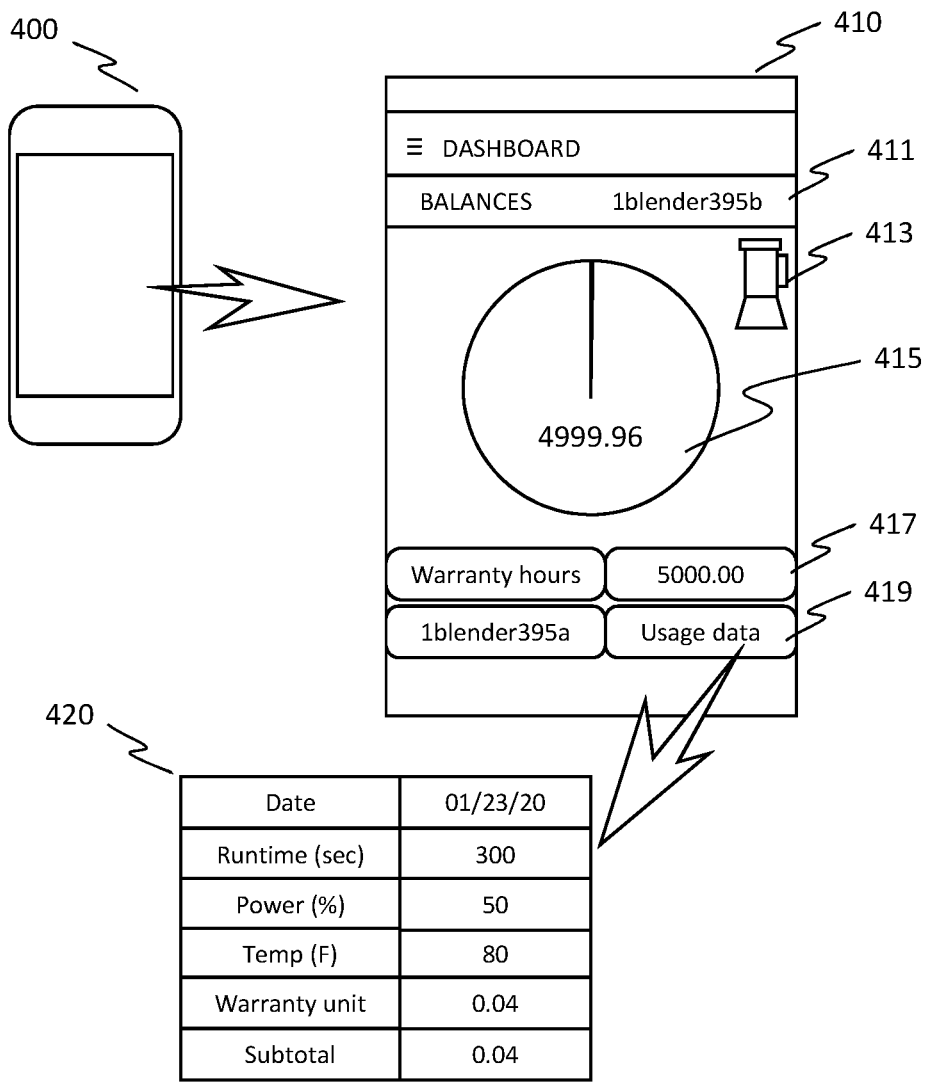
FIG. 4 depicts an exemplary display of a user interface application on a mobile device, in accordance with one or more embodiments set forth herein.

FIG. 4 depicts an exemplary display of the UIA 160 on a mobile device 400, in accordance with one or more embodiments set forth herein When the user 101 uses the IoT device 110 "1blender395" for the first time, the IoT device 110 "1blender395" reports the usage with a time-attribute stamp "1blender39520012305005025080", indicating that the IoT device 110 "1blender395" ran on Jan. 23, 2020 (200123), for five minutes (0500), at a fifty percent power level (50), in a twenty-five percent humidity (25) and eighty-degree temperature in Fahrenheit (° F.) (080).

In the example of FIG. 3, when the blockchain network 120 receives the usage report of the time-attribute stamp instantiated as above from the IoT device 110 "1blender395", the manufacture wallet 150 activates the IoT device usage data wallet 130 "1blender395a" by the transaction 303-304, and activates the IoT device warranty balance wallet 140 "1blender395b" by the transaction 301-302. "1blender395a" and "1blender395b" are public information that can be used to access the respective wallets, which often referred to as wallet addresses. In certain embodiments of the present invention, the manufacturer wallet 150 activates the IoT device usage data wallet 130 "1blender395a" by loading an initial value of the usage reporting credits of one hundred (100), which is configured to decrease 0.001 for every reporting of a run cycle. In the same embodiments of the present invention, the manufacturer wallet 150 activates the IoT device warranty balance wallet 140 "1blender395b" by loading an initial value of the warranty balance of five thousand (5000) for the IoT device 110 "1blender395". The manufacturer 109 sets respective values of the usage reporting credits and the warranty balance for the IoT devices 110 according to the characteristics of each IoT device 110 in types and pattern of the use for the IoT devices 110. For example, a laptop computer and a blender would be set with respective values of the usage reporting credits and the warranty balance, based on the characteristics of each IoT device and use pattern typical for each IoT device.

For example, a battery would be covered by a warranty to maintain eighty percent (80%) of capacity for five hundred (500) cycles of charge and discharge at a range of ambient temperature below one hundred degrees in Fahrenheit (100° F.), but two hundred and fifty (250) cycles of charge and discharge at a range of ambient temperature equal or higher than one hundred degrees in Fahrenheit (100° F.). Accordingly, in certain embodiments of the present invention, if each cycle of charge and discharge cycle is configured to subtract one (1) unit from the warranty balance for the battery, then another cycle of charge and discharge cycle would be configured to subtract two (2) units from the warranty balance for the same battery. The warranty balance becomes zero (0) the warranty for the battery expires, and the user 101 can view the warranty balance and purchase an extended warranty.

When balance reaches 0, warranty coverage expires. The manufacturer and user of product can transparently check how much balance is left in the warranty wallet.

For another example, a warranty on a video camera will be presented with a recommended operating conditions such as "warranty based operating temperature range −20 to 110 degrees Fahrenheit, humidity range 20% to 95%", such that the manufacturer 109 can reduce or avoid any warranty coverage if the recommended operating conditions are not satisfied consistently, as functionalities of the video camera would deteriorate significantly under the circumstances even without any defect on the product.

An exemplary screen 410 titled "DASHBOARD" shows a dashboard of information relevant to the warranty of the IoT device 110 "1blender395" after the usage report of the time-attribute stamp instantiated as above. The icon on the left of "DASHBOARD" indicates a main menu of the UIA 160.

Section 411 in the dashboard 410 stating "BALANCES; 1blender395b" indicates the IoT device warranty balance wallet 140 is named as "1blender395b" and the current warranty balance is shown by a pie chart 415 for the IoT device 110 "1blender395" as depicted in an image 413.

Section 417 "Warranty hours; 5000.00" indicates that the initial warranty balance loaded to the IoT device warranty balance wallet 140 "1blender395b" is five thousand (5000.00).

Section 419 "1blender395a; Usage data" indicates that the IoT device usage data wallet 130 named "1blender395a" stores usage data for the IoT device 110 "1blender395". The Usage data can be further navigable upon being selected by the user 101, for example, as the user 101 tap the area on and around the tab "Usage data" on a touch screen of the mobile device 400, or as the user 101 clicks the tab "Usage data" on a web browser.

Table 420 depicts items recorded in the usage data blockchain by the IoT device usage data wallet 130 "1blender395a". The usage data blockchain recorded by the IoT device usage data wallet 130 "1blender395a" includes information reported in the usage report of the time-attribute stamp instantiated as above. The first use of running the blender IoT device "1blender395" for five minutes at fifty percent power level in eighty-degree temperature would account as depreciating 0.04 warranty hours in table 420. The current warranty balance after the first use as recorded in the IoT device warranty balance wallet 140 "1blender395b" is also shown on the pie chart 415.

Certain embodiments of the present invention provide the enhanced warranty system for IoT devices on a blockchain network in providing a usage-based warranty that improves conventional period-based warranty systems. Certain embodiments of the present invention implement two types of wallets for the IoT device in the blockchain network, an IoT device usage wallet to keep track of the usage records of the IoT device and an IoT device warranty balance wallet to keep track of a warranty balance. Certain embodiments of the present invention implement that the manufacturer of the IoT device loads a certain number of reporting credits to the IoT device usage wallet to be reduced per each usage report. Certain embodiments of the present invention implement that the manufacturer of the IoT device loads a certain amount of warranty balance the IoT device warranty balance wallet to be reduced by a specific warranty balance value corresponding to each usage report. Certain embodiments of the present invention implement that the IoT device would be automatically registered with the blockchain network to start the warranty coverage when the IoT device first communicates with the blockchain network by sending a usage report. Certain embodiments of the present invention translate each usage record as reported in real time by the IoT device to a corresponding amount of warranty balance and subtract the amount of warranty balance corresponding to the usage record automatically from the IoT device warranty balance as a series of blockchain wallet transactions. Certain embodiments of the present invention provide a user interface application that facilitates for the user to view up-to-date usage records on the IoT device and the current value of the warranty balance of the IoT device as being updated by the aforementioned blockchain transactions upon each use of the IoT device. Certain embodiments of the present invention facilitate, by use of the user interface application, the user to be notified with an upcoming expiration of the warranty as well as to extend the warranty.

Certain embodiments of the present invention provide a computer implemented method including, but not limited to: obtaining, by one or more processors, a usage report of an Internet of Things (IoT) device in a predefined format; recording, by the one or more processors, the usage report of the IoT device in a blockchain network; updating, by the one or more processors, a warranty balance for the IoT device by reducing an amount of the warranty balance corresponding to the usage report of the IoT device from a current value of the warranty balance, wherein the warranty balance for the IoT device is stored in the blockchain network; and resolving, by the one or more processors, a warranty claim on the IoT device based on respective blockchain records of the usage report and the warranty balance regarding the IoT device.

Certain embodiments of the present invention provide the computer implemented method as above further including, but not limited to: ascertaining that the usage report is sent from the IoT device for the first time; and registering the IoT device with the blockchain network by use of device metadata that uniquely identifies the IoT device.

Certain embodiments of the present invention provide the computer implemented method as above further including, but not limited to: receiving a request for access to usage data of the IoT device resulting from the recording for all run cycles on the IoT device from a user of the IoT device via a user interface application running on a mobile device; retrieving the usage data of the IoT device from the blockchain network; and displaying the usage data of the IoT device from the retrieving on the user interface application running on the mobile device.

Certain embodiments of the present invention provide the computer implemented method as above further including, but not limited to: receiving a request for access to the warranty balance of the IoT device resulting from the updating for all run cycles on the IoT device from a user of the IoT device via a user interface application running on a mobile device; retrieving the warranty balance of the IoT device from the blockchain network; and displaying the warranty balance of the IoT device from the retrieving on the user interface application running on the mobile device.

Certain embodiments of the present invention provide the computer implemented method as above, the recording including, but not limited to: performing, by an IoT device usage wallet for the IoT device, a blockchain transaction to record the usage report of the IoT device from the obtaining in the blockchain network; and performing another blockchain transaction to reduce a preconfigured amount of reporting credits corresponding to the usage report from the IoT device usage wallet, wherein the IoT device usage wallet is loaded with an initial amount of reporting credits by a manufacturer of the IoT device.

Certain embodiments of the present invention provide the computer implemented method as above, the updating including, but not limited to: ascertaining the amount of the warranty balance corresponding to the usage report of the IoT device from the obtaining; and performing, by an IoT device warranty balance wallet for the IoT device, a blockchain transaction to reduce, from the current value of the warranty balance, the amount of warranty balance corresponding to the usage report of the IoT device from the ascertaining, wherein the IoT device warranty balance wallet is loaded with an initial amount of warranty balance for the IoT device by a manufacturer of the IoT device.

Certain embodiments of the present invention provide the computer implemented method as above, in which the predefined format of the usage report of the IoT device includes a time stamp and one or more data values on preselected attributes of run cycles that affect functionalities of the IoT device for the purpose of warranty and environmental conditions that affect the warranty of the IoT device.

Figure 5:
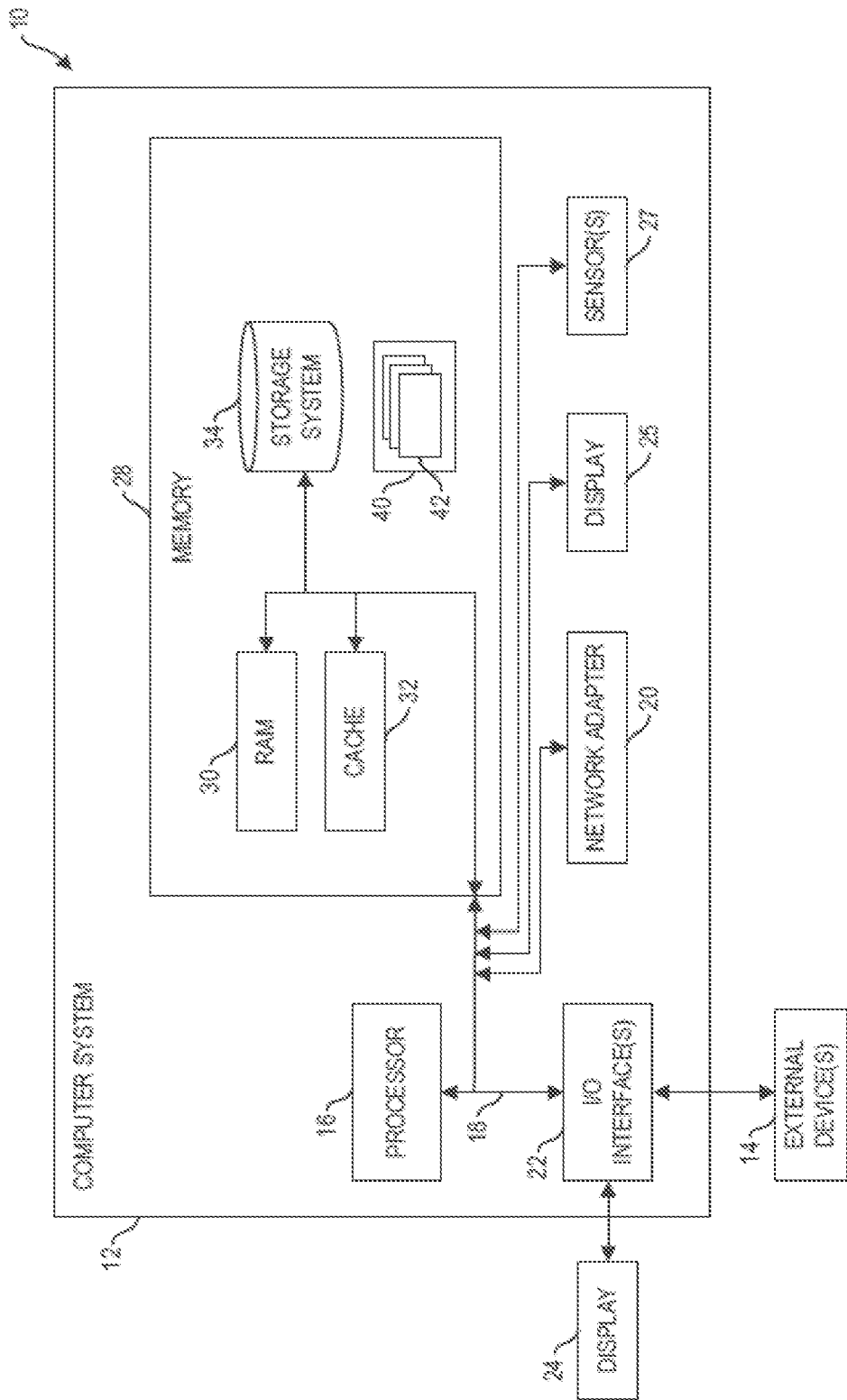
FIG. 5 depicts a cloud computing node according to an embodiment of the present invention.
Figure 6:
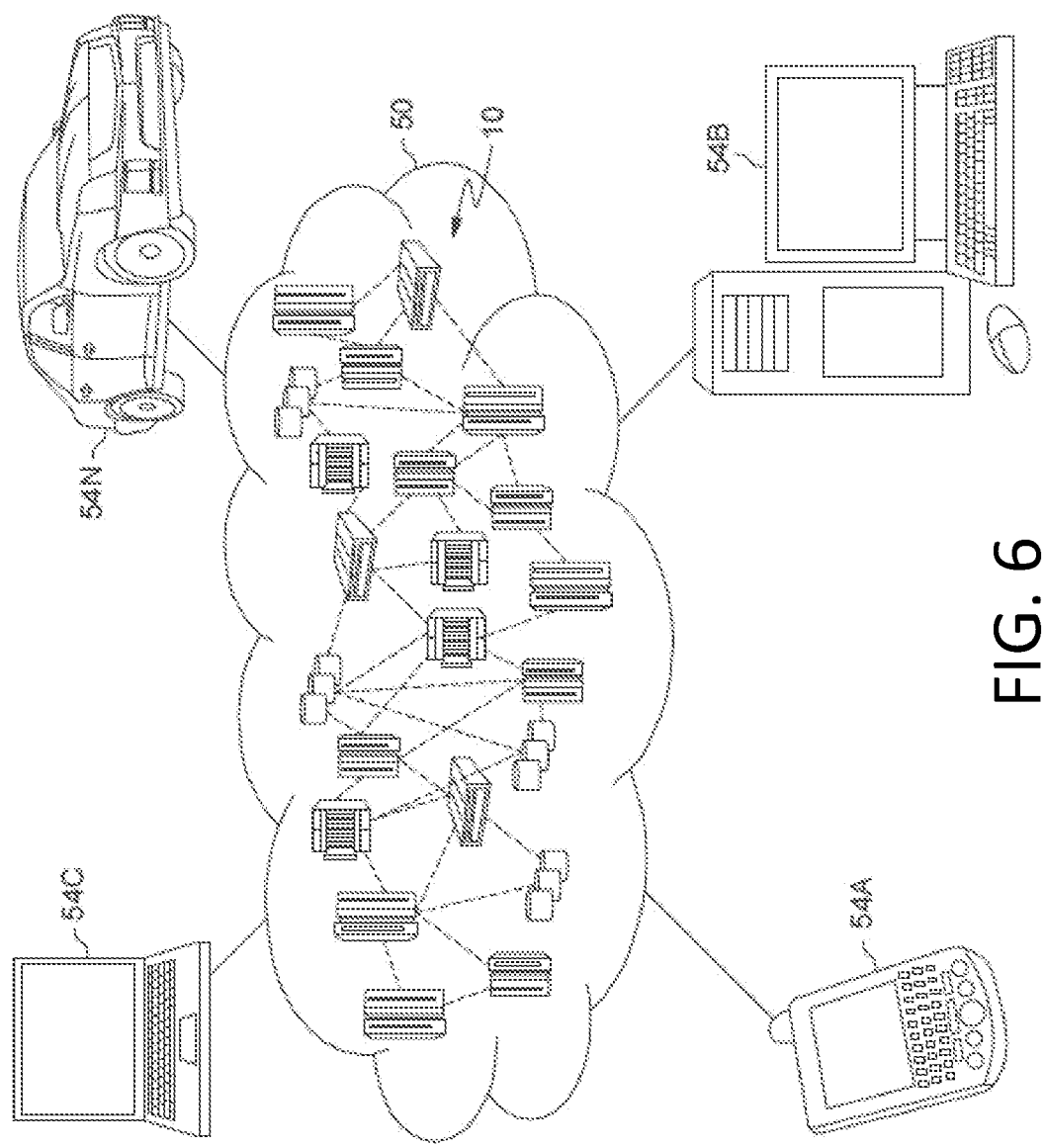
FIG. 6 depicts a cloud computing environment according to an embodiment of the present invention.
Figure 7:
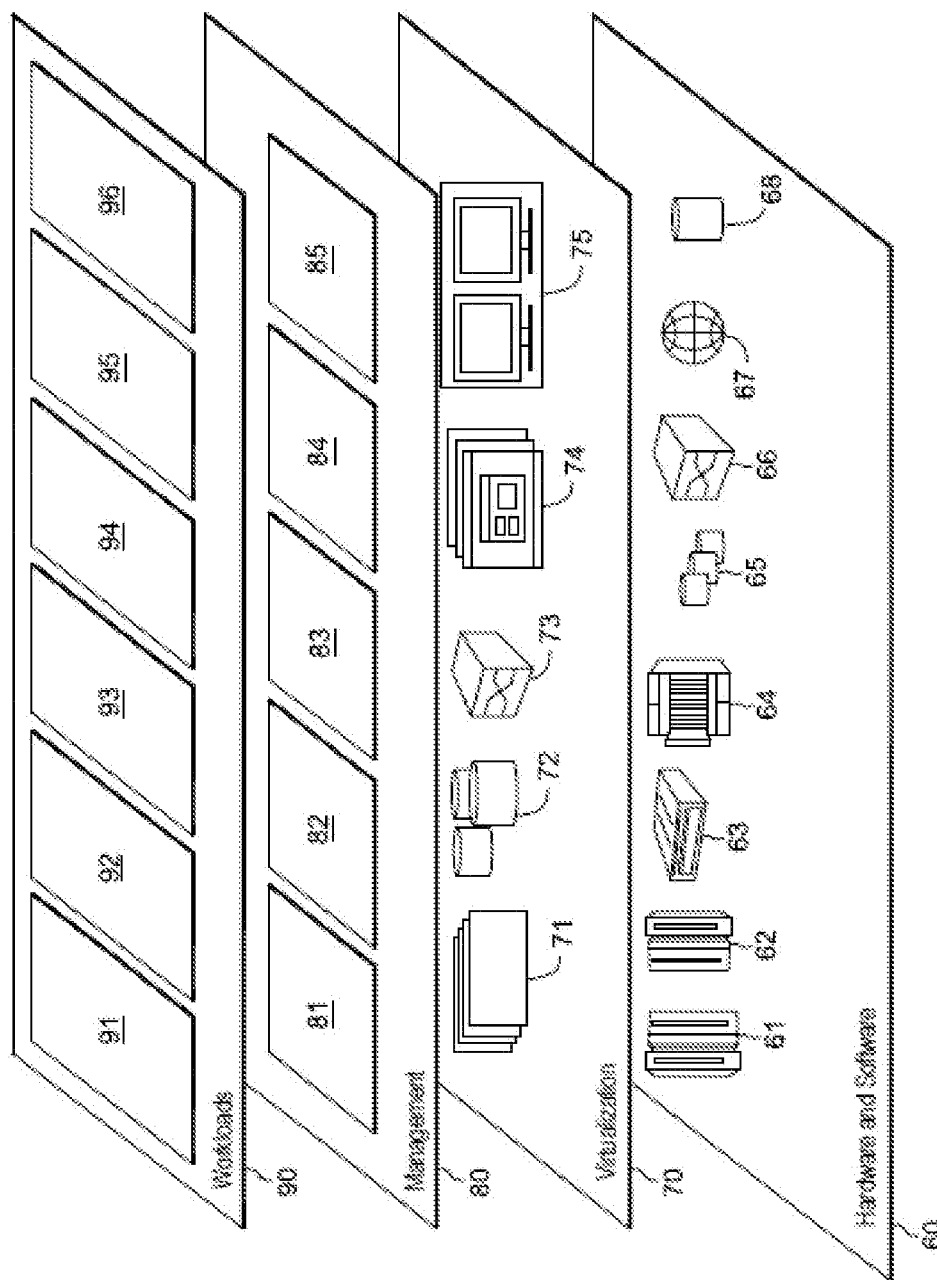
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the user interface application 160, the IoT device 110, the IoT device usage wallet 130, the IoT device warranty balance wallet 140, and the manufacturer wallet 150. Program processes 42, as in the components of the enhanced warranty system 100 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the enhanced warranty system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining, by one or more processors, a usage report of an Internet of Things (IoT) device in a predefined format;
recording, by the one or more processors, the usage report of the IoT device in a blockchain network, wherein the recording comprises performing, by an IoT device usage wallet for the IoT device running on the one or more processors, a blockchain transaction to record the usage report of the IoT device from the obtaining in the blockchain network; and performing, by the one or more processors, another blockchain transaction to reduce a preconfigured amount of reporting credits corresponding to the usage report from the IoT device usage wallet, wherein the IoT device usage wallet is loaded with an initial amount of reporting credits by a manufacturer of the IoT device;
updating, by the one or more processors, a warranty balance for the IoT device by reducing an amount of the warranty balance corresponding to the usage report of the IoT device from a current value of the warranty balance, wherein the warranty balance for the IoT device is stored in the blockchain network; and
resolving, by the one or more processors, a warranty claim on the IoT device based on respective blockchain records of the usage report and the warranty balance regarding the IoT device.

2. A computer implemented method comprising:
obtaining, by one or more processors, a usage report of an Internet of Things (IoT) device in a predefined format;
recording, by the one or more processors, the usage report of the IoT device in a blockchain network;
updating, by the one or more processors, a warranty balance for the IoT device by reducing an amount or the warranty balance corresponding to the usage report of the IoT device from a current value of the warranty balance, wherein the warranty balance for the IoT device is stored in the blockchain network; and
resolving, by the one or more processors, a warranty claim on the IoT device based on respective blockchain records of the usage report and the warranty balance regarding the IoT device.

3. The computer implemented method of claim 2, further comprising:
receiving, by the one or more processors, a request for access to usage data of the IoT device resulting from the recording for all run cycles on the IoT device from a user of the IoT device via a user interface application running on a mobile device;
retrieving, by the one or more processors, the usage data of the IoT device from the blockchain network; and
displaying, by the one or more processors, the usage data of the IoT device from the retrieving on the user interface application running on the mobile device.

4. The computer implemented method of claim 2, further comprising:
receiving, by the one or more processors, a request for access to the warranty balance of the IoT device resulting from the updating for all run cycles on the IoT device from a user of the IoT device via a user interface application running on a mobile device;
retrieving, by the one or more processors, the warranty balance of the IoT device from the blockchain network; and
displaying, by the one or more processors, the warranty balance of the IoT device from the retrieving on the user interface application running on the mobile device.

5. The computer implemented method of claim 2, the recording comprising:
performing, by an IoT device usage wallet for the IoT device running on the one or more processors, a blockchain transaction to record the usage report of the IoT device from the obtaining in the blockchain network; and performing, by the one or more processors, another blockchain transaction to reduce a preconfigured amount of reporting credits corresponding to the usage report from the IoT device usage wallet, wherein the IoT device usage wallet is loaded with an initial amount of reporting credits by a manufacturer of the IoT device.

6. The computer implemented method of claim 1, the updating comprising:
ascertaining, by the one or more processors, the amount of the warranty balance corresponding to the usage report of the IoT device from the obtaining; and
performing, by an IoT device warranty balance wallet for the IoT device running on the one or more processors, a blockchain transaction to reduce, from the current value of the warranty balance, the amount of warranty balance corresponding to the usage report of the IoT device from the ascertaining, wherein the IoT device warranty balance wallet is loaded with an initial amount of warranty balance for the IoT device by a manufacturer of the IoT device.

7. The computer implemented method of claim 2, wherein the predefined format of the usage report of the IoT device includes a time stamp and one or more data values on preselected attributes of run cycles that affect functionalities of the IoT device for the purpose of warranty and environmental conditions that affect the warranty of the IoT device.

8. A system comprising:
a memory;
one or more processors in communication with the memory; and
program instructions executable by the one or more processors via the memory to perform a method comprising:
iteratively obtaining a usage report of an Internet of Things (IoT) device in a predefined format reported from the IoT device using environmental condition sensor output data that is output by an environmental condition sensor of the IoT device that detects an attribute of an operating environment of the IoT device, wherein the predefined format of the usage report of the IoT device includes a time stamp and one or more data values produced by the environmental condition sensor on preselected attributes of run cycles that affect functionalities of the IoT device for the purpose of warranty and environmental conditions that affect the warranty of the IoT device;
iteratively recording the usage report of the IoT device, including the time stamp and one or more data values produced by the environmental condition sensor on preselected attributes of run cycles that affect functionalities of the IoT device, in a blockchain network;
iteratively updating a warranty balance for the IoT device by reducing an amount of the warranty balance corresponding to the usage report of the IoT device from a current value of the warranty balance, wherein the warranty balance for the IoT device is stored in the blockchain network;
iteratively updating a user interface presented to a user of the IoT device, wherein the iteratively updating the user interface presented to a user of the IoT device is in dependence on the iteratively updating of the warranty balance and the iteratively recording of the usage report of the IoT device, the iteratively recorded usage report including, for respective iterations of the usage report, the time stamp and one or more data values produced by the environmental condition sensor on preselected attributes of run cycles that affect functionalities of the IoT device; and
resolving a warranty claim on the IoT device based on respective blockchain records of the usage report and the warranty balance regarding the IoT device.

9. The system of claim 8, further comprising:
ascertaining that the usage report is sent from the IoT device for the first time; and
registering the IoT device with the blockchain network by use of device metadata that uniquely identifies the IoT device.

10. The system of claim 8, further comprising:
receiving a request for access to usage data of the IoT device resulting from the recording for all run cycles on the IoT device from a user of the IoT device via a user interface application running on a mobile device;
retrieving the usage data of the IoT device from the blockchain network; and
displaying the usage data of the IoT device from the retrieving on the user interface application running on the mobile device.

11. The system of claim 8, further comprising:
receiving a request for access to the warranty balance of the IoT device resulting from the updating for all run cycles on the IoT device from a user of the IoT device via a user interface application running on a mobile device;
retrieving the warranty balance of the IoT device from the blockchain network; and
displaying the warranty balance of the IoT device from the retrieving on the user interface application running on the mobile device.

12. The system of claim 8, the recording comprising:
performing, by an IoT device usage wallet for the IoT device, a blockchain transaction to record the usage report of the IoT device from the obtaining in the blockchain network; and
performing another blockchain transaction to reduce a preconfigured amount of reporting credits corresponding to the usage report from the IoT device usage wallet, wherein the IoT device usage wallet is loaded with an initial amount of reporting credits by a manufacturer of the IoT device.

13. The system of claim 8, the updating comprising:
ascertaining the amount of the warranty balance corresponding to the usage report of the IoT device from the obtaining; and
performing, by an IoT device warranty balance wallet for the IoT device, a blockchain transaction to reduce, from the current value of the warranty balance, the amount of warranty balance corresponding to the usage report of the IoT device from the ascertaining, wherein the IoT device warranty balance wallet is loaded with an initial amount of warranty balance for the IoT device by a manufacturer of the IoT device.

14. The system of claim 13, wherein the IoT device embeds therein with the environmental condition sensor a timer for use in generating working condition data items included in the iteratively updated usage report that is iteratively recorded in the blockchain network, wherein the working condition data items generated with use of the timer include number of run cycles, intervals between run cycles, and length of respective run cycles of the IoT device.

15. The system of claim 8, wherein the recording comprises performing, by an IoT device usage wallet for the IoT device running on the one or more processors, a blockchain transaction to record the usage report of the IoT device from the obtaining in the blockchain network; and performing, by the one or more processors, another blockchain transaction to reduce a preconfigured amount of reporting credits corresponding to the usage report from the IoT device usage wallet, wherein the IoT device usage wallet is loaded with an initial amount of reporting credits by a manufacturer of the IoT device, wherein the updating comprises ascertaining, by the one or more processors, the amount of the warranty balance corresponding to the usage report of the IoT device from the obtaining; and performing, by an IoT device warranty balance wallet for the IoT device running on the one or more processors, a blockchain transaction to reduce, from the current value of the warranty balance, the amount of warranty balance corresponding to the usage report of the IoT device from the ascertaining, wherein the IoT device warranty balance wallet is loaded with an initial amount of warranty balance for the IoT device by a manufacturer of the IoT device, wherein the obtaining is performed responsively to the IoT device reporting, in real time, instances of encoded IoT runs, wherein the IoT device embeds therein with the environmental condition sensor a timer for use in generating working condition data items included in the iteratively updated usage report that is iteratively recorded in blockchain network, wherein the working condition data items generated with use of the timer include number of run cycles, intervals between run cycles, and length of respective run cycles of the IoT device.

16. The computer implemented method of claim 2, further comprising:
   ascertaining, by the one or more processors, that the usage report is sent from the IoT device for the first time; and
   registering, by the one or more processors, the IoT device with the blockchain network by use of device metadata that uniquely identifies the IoT device.

17. The computer implemented method of claim 2, wherein the obtaining is performed responsively to the IoT device reporting, in real time, instances of encoded IoT device usage data to an IoT device usage wallet in the blockchain network when the IoT device runs.

18. The computer implemented method of claim 2, wherein the obtaining is performed responsively to the IoT device reporting, in real time, instances of encoded IoT runs, wherein the IoT device embeds therein with an environmental condition sensor a timer for use in generating working condition data items included in the usage report, wherein the usage report is iteratively recorded in the blockchain network, and wherein the working condition data items generated with use of the timer include number of run cycles, intervals between run cycles, and length of respective run cycles of the IoT device.

19. The computer implemented method of claim 2, the updating comprising:
   ascertaining, by the one or more processors, the amount of the warranty balance corresponding to the usage report of the IoT device from the obtaining; and
   performing, by an IoT device warranty balance wallet for the IoT device running on the one or more processors, a blockchain transaction to reduce, from the current value of the warranty balance, the amount of warranty balance corresponding to the usage report of the IoT device from the ascertaining, wherein the IoT device warranty balance wallet is loaded with an initial amount of warranty balance for the IoT device by a manufacturer of the IoT device.

* * * * *